(12) United States Patent
Fern et al.

(10) Patent No.: US 12,353,682 B2
(45) Date of Patent: Jul. 8, 2025

(54) PARTNERSHIP CONFIGURATION ENGINE

(71) Applicant: Better Holdco, Inc., New York, NY (US)

(72) Inventors: Adam Jeremy Fern, Brooklyn, NY (US); Ilia Rogov, Wilton, CT (US)

(73) Assignee: Better Holdco, Inc., New York, NY (US)

( * ) Notice: Subject to any disclaimer, the term of this patent is extended or adjusted under 35 U.S.C. 154(b) by 0 days.

(21) Appl. No.: 17/394,761

(22) Filed: Aug. 5, 2021

(65) Prior Publication Data

US 2023/0039797 A1    Feb. 9, 2023

(51) Int. Cl.
| | |
|---|---|
| *G06F 3/0484* | (2022.01) |
| *G06Q 10/0631* | (2023.01) |
| *H04L 67/00* | (2022.01) |
| *H04L 67/53* | (2022.01) |
| *H04L 67/60* | (2022.01) |

(52) U.S. Cl.
CPC ....... *G06F 3/0484* (2013.01); *G06Q 10/0631* (2013.01); *H04L 67/34* (2013.01); *H04L 67/53* (2022.05); *H04L 67/60* (2022.05)

(58) Field of Classification Search
None
See application file for complete search history.

(56) References Cited

U.S. PATENT DOCUMENTS

| | | | | |
|---|---|---|---|---|
| 8,583,769 B1* | 11/2013 | Peters | ................... | H04L 63/104 |
| | | | | 709/221 |
| 2015/0142947 A1* | 5/2015 | Dyba | ..................... | H04W 4/24 |
| | | | | 709/224 |
| 2018/0139110 A1* | 5/2018 | Johnson | .............. | H04L 41/5054 |
| 2020/0014751 A1* | 1/2020 | Laursen | ................. | H04L 63/08 |

* cited by examiner

*Primary Examiner* — Anh Nguyen

(57) ABSTRACT

Aspects of the present disclosure relate to a partnership configuration engine. In examples, a configuration engine may maintain configuration information associated with one or more providers for which a partnership service provides computing functionality. For example, a partnership service may provide a website, generate electronic communications, and/or perform data processing associated with a third-party provider. The configuration engine may maintain a set of configuration items associated with such a third-party provider, such that functionality of the partnership service is configured accordingly. Thus, as a result of maintaining such configuration information, the partnership service may be configured to provide functionality for any number of providers. Further, data duplication may be reduced and complexity may be reduced as a result of such a configuration information repository.

14 Claims, 6 Drawing Sheets

PARTNERSHIP CONFIGURATION ENGINE

BACKGROUND

A provider may use computing resources of a partnership service to fulfil requests by a customer device associated with a customer of the provider. However, configuration of the partnership service to accommodate multiple such providers may be complex and time consuming, especially in instances where providers have different associated user experiences and workflows.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to a partnership configuration engine. In examples, a configuration engine may maintain configuration information associated with one or more providers for which a partnership service provides computing functionality. For example, a partnership service may provide a website, generate electronic communications, and/or perform data processing associated with a third-party provider. The configuration engine may maintain a set of configuration items associated with such a third-party provider, such that functionality of the partnership service is configured accordingly. Thus, as a result of maintaining such configuration information, the partnership service may be configured to provide functionality for any number of providers. Further, data duplication may be reduced and complexity may be reduced as a result of such a configuration information repository.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
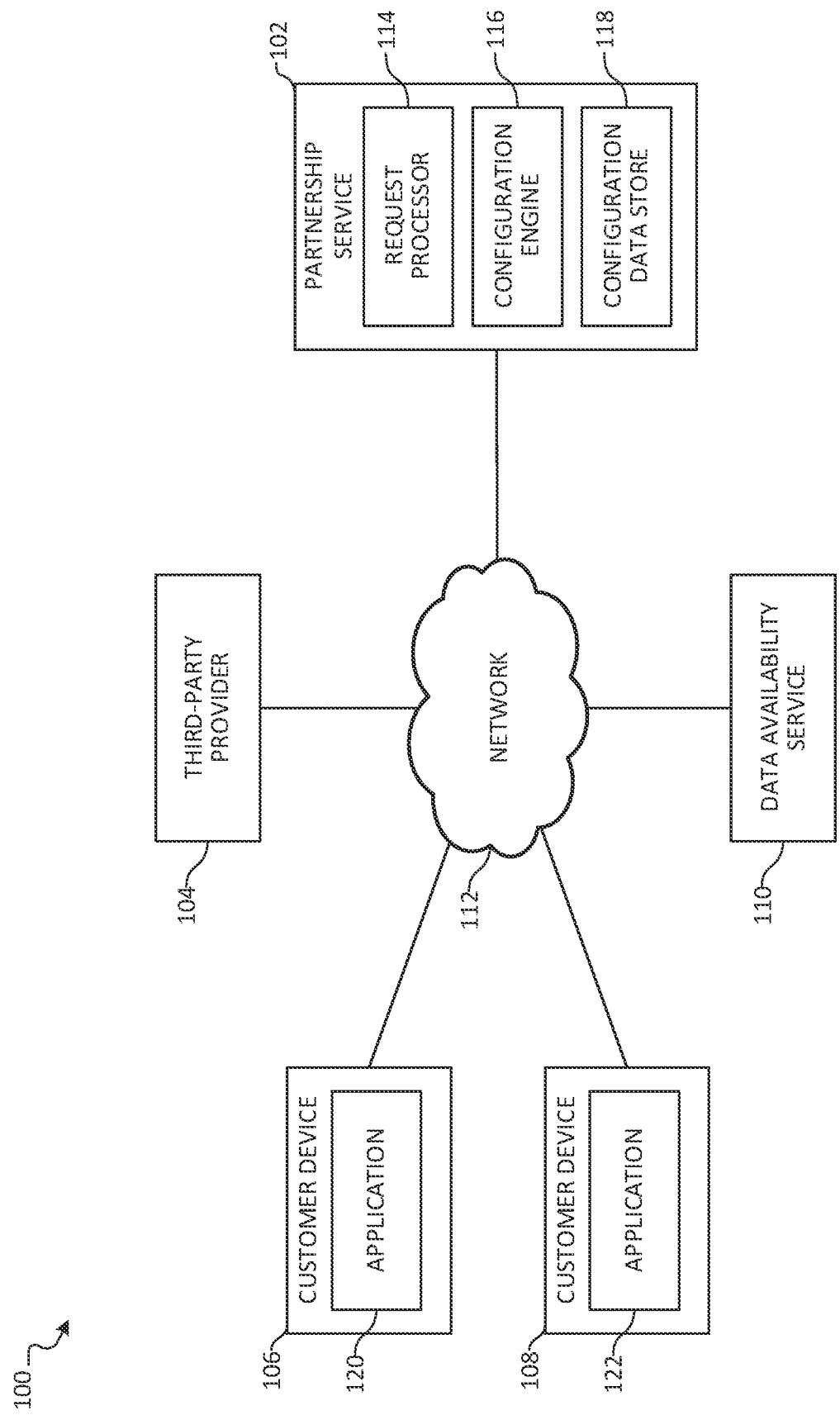
FIG. 1 illustrates an overview of an example system in accordance with the partnership configuration engine described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

A partnership service may be used by a third-party provider to process requests from customer devices associated with customers of the third-party provider. Aspects of the partnership service may be configured for a specific third-party provider, for example to mimic a website or electronic communications of the third-party provider (e.g., to have similar branding or to offer a consistent user experience), or according to a data processing specifications of the third-party provider (e.g., to gather certain data or validate data according to certain criteria). Thus, such provider-specific customizations may affect various aspects of the functionality provided by the partnership service. However, given the varying and potentially pervasive configuration changes involved in configuring the partnership service for use by the third-party provider, it may be difficult for the partnership service to be configured for use by other providers. As a result, servicing an additional provider may require a large amount of time and/or associated manual effort, which has the potential for user dissatisfaction and human error, among other detriments.

Accordingly, aspects of the present application relate to a partnership configuration engine. In examples, the partnership configuration engine maintains configuration information for third-party providers associated with a partnership service, thereby enabling functionality of the partnership service to be configured for a new third-party provider or to update the configuration of an existing third-party provider via the configuration engine. As a result of maintaining configuration information at the partnership configuration engine rather than separately configuring various functionality, the partnership service may be more easily adapted for use by third-party providers, thereby increasing the speed with which such configuration changes may be implemented and reducing the potential for human error, among other examples. Further, functionality of the partnership service may be more consistent as a result of the partnership configuration engine, rather than potentially re-implementing provider-specific customizations across the partnership service.

While examples are described herein with respect to functionality of a partnership service (e.g., as may be provided by one or more server devices of the partnership service), it will be appreciated that similar techniques may be applied to any of a variety of devices, such as devices associated with a third-party provider. For example, a computing device of the third-party provider may obtain configuration information from a partnership configuration engine of the partnership service, such that configuration may be used to configure functionality of the third-party in addition to functionality of the partnership service, thereby reducing the potential for duplicative and/or stale data. Thus, the third-party provider may similarly implement and benefit from functionality customization resulting from the partnership configuration engine aspects described herein.

FIG. 1 illustrates an overview of an example system 100 in accordance with the partnership configuration engine described herein. As illustrated, system 100 comprises partnership service 102, third-party provider 104, customer devices 106 and 108, data availability service 110, and network 112. In examples, partnership service 102, third-party provider 104, customer devices 106 and 108, and data availability service 110 communicate via network 112. For example, network 112 may comprise a local area network, a wireless network, or the Internet, or any combination thereof, among other examples. As an example, partnership service 102, third-party provider 104, and data availability service 110 may each comprise a set of computing devices.

As illustrated, partnership service 102 comprises request processor 114, configuration engine 116, and configuration data store 118. In examples, request processor 114 provides a variety of functionality of partnership service 102. For example, request processor 114 may provide a website of partnership service 102, which may be configured according to configuration information for a specific provider (e.g., third-party provider 104) according to aspects described herein. As another example, request processor 114 may generate electronic communications or may process requests from an application of a customer device (e.g., application 120 or 122 of customer devices 106 and 108, respectively). In a further example, request processor 114 may process user input received from application 120 or application 122, which may be developed by or otherwise associated with third-party provider 104. While example functionality is described with respect to request processor 114, it will be appreciated that any of a variety of alternative and/or additional functionality may be configured according to the partnership configuration engine aspects described herein.

When request processor 114 performs such processing, request processor 114 may obtain configuration information from configuration engine 116. In examples, request processor 114 may determine an associated set of attributes. Examples include, but are not limited to, an associated tenant, provider (e.g., third-party provider 104), geographical region (e.g., from which a customer device is accessing partnership service 102 or of an associated user), product or service of the provider, and/or provider-specified attributes, among other examples. In examples, some attributes may be included in a request that is received by request processor 114 or request processor 114 may determine them (e.g., based on a manner by which the request was received, for example in association with a domain name, subdomain, or email address of third-party provider 104), among other examples. Such attributes may be provided to configuration engine 116, such that configuration engine 116 may generate configuration information according to the set of attributes.

For example, configuration engine 116 may identify configuration information associated with the set of attributes from configuration data store 118. In examples, configuration data store 118 stores configuration information in a hierarchy. For instance, a first set of configuration items may relate to a tenant (e.g., of a computing environment in which a request processor performs processing), a second set of configuration items may relate to a provider (e.g., third-party provider 104), and a third set of configuration items may relate to a geographical location. Configuration engine 116 may thus generate configuration information based on identified configuration items accordingly.

Configuration engine 116 may resolve conflicts between identified configuration items according to the hierarchy in which they are stored. For example, configuration items associated with a geographic region may take precedence over configuration items associated more generally with a provider. Similarly, configuration items associated with a provider may take precedence over configuration items associated with a tenant. Geographic-specific configuration items may be used by a provider to account for differences among regions in which the provider operators, for example legal differences, environmental differences, linguistic differences, or cultural differences, among other examples. In some instances, a configuration item may be associated with partnership service 102, such that it applies to all or most providers. For example, partnership service 102 may specify a configuration item to ensure a provider does not change, misconfigure, or override certain aspects of partnership service 102. Thus, a partnership service configuration item may take precedence over other types of configuration items.

In some instances, a set of configuration items for a provider may be pre-populated, for example from a preexisting configuration. In some examples, there may be multiple such preexisting configurations, such that, for example, the provider may select a preexisting configuration accordingly. As another example, a first preexisting configuration may be associated with a first type of provider, while a second preexisting configuration may be associated with a second type of provider. Example provider types include, but are not limited to, a lead provider (e.g., where the provider may redirect a user to partnership service 102), a cobranded or broker provider (e.g., where the provider may only partially configure partnership service 102, such that it may be evident that partnership service 102 is used by the provider), or a lender provider (e.g., where partnership service 102 is configured to have an appearance that is consistent with the lender, such that it is not easily evident that partnership service 102 is used by the provider).

While example hierarchical tiers, configuration item storage, and configuration information generation techniques are described, it will be appreciated that any of a variety of techniques may be used. For example, object-oriented inheritance may be used to generate configuration information according to a set of attributes and associated configuration items.

As noted above, configuration data store 118 stores any of a variety of configuration items in association with attributes to which they apply. Example configuration items include, but are not limited to, items relating to a user interface (e.g., icons, logos, stylesheets, colors, or layouts), content (e.g., a privacy policy, text localization, or electronic disclosures), or processing (e.g., relating to data collection workflows, application behavior, or data processing). Thus, it will be appreciated that a configuration item may contain any of a variety of information used to configure functionality of partnership service 102, including, but not limited to, Boolean values, string data, image data, hexadecimal data, binary data, and/or executable data. Further, a configuration item may comprise an indication of a template and/or may be used (e.g., by request processor 114) to populate a template based on information stored therein.

Configuration items need not be mutually exclusive. As an example, two configuration items may exist at the same hierarchy, each of which configure similar aspects of partnership service 102. A/B testing may be performed, where a first configuration item is used to configure functionality of partnership service 102 for a first subset of users, while a second configuration item is used to configure partnership service 102 for a second subset of users. Thus, aspects described herein may enable evaluation of a first configuration as compared to a second configuration based on the first subset and second subset of users, such that one configuration may ultimately be selected.

As an example, request processor 114 may identify a template and may generate a webpage or electronic communication according to the template. Configuration information provided by configuration engine 116 may be used to populate placeholders of the template, such as a page title, a background color, and/or a logo. In some instances, request processor 114 may further determine whether a user interface element should be included in the generated webpage or email, for example according to an associated Boolean value.

In examples where request processor 114 is processing user input (e.g., as may be received from customer device 106 or customer device 108), request processor 114 may process the received input according to the configuration information. For example, request processor 114 may validate the received user input according to a specified threshold or based on matching logic of the configuration information. As another example, request processor 114 may execute binary data of the configuration information to generate a processing result, which may be stored and/or subsequently processed as specified by the configuration information. As a further example, request processor 114 may perform a workflow specified by the configuration information, such as transmitting an indication of the received user input as an electronic communication for access by another user.

In examples, data availability service 110 may cache, mirror, or otherwise store at least a part of the configuration of configuration data store 118, such that it may be accessible in instances where configuration engine 116 is unavailable. For example, configuration engine 116 may generate a representation of configuration data store 118 that is provided to data availability service 110. Accordingly, if it is determined that configuration engine 116 is unavailable, request processor 114 or applications 120 or 122 may obtain configuration information from data availability service 110. The representation provided by configuration engine 116 may similarly be hierarchical, such that the configuration information is determined dynamically, as discussed above. As another example, data availability service 110 may not comprise a similar configuration engine, such that a static representation is generated by configuration engine 116 and provided to data availability service 110 accordingly.

Customer device 106 and customer device 108 are illustrated as comprising application 120 and application 122, respectively. Aspects of application 122 are similar to those of application 120 and are therefore not necessarily re-described below in detail. Application 120 may be developed by third-party provider 104 and/or partnership service 102. For example, partnership service 102 may produce a similar application for multiple providers, where the functionality of the application is configured according to configuration information as described herein. Application 120 may be a native application executing on customer device 106. In other examples, application 120 is a web browser used to access a website provided by request processor 114.

In examples, application 120 obtains configuration information associated with a provider, such as third-party provider 104. Accordingly, application 120 may configure its associated functionality based on the configuration information. For example, application 120 may obtain configuration information from configuration engine 116 of partnership service 102. In instances where configuration engine 116 is unavailable, application 120 may instead obtain configuration information from data availability service 110. Examples of such an unavailability condition include, but are not limited to, a communication issue associated with network 112 or a crash or configuration error associated with configuration engine 116, among other examples. In some examples, application 120 caches obtained configuration information, such that locally cached configuration information may be used in instances where configuration engine 116 is unavailable.

While examples are described herein with respect to the use of configuration information by request processor 114, application 120, and application 122, it will be appreciated that any of a variety of additional or alternative elements may utilize the configuration information. For example, partnership service 102 may implement an application programming interface (API), via which configuration information may be accessed for use by a third party (e.g., third-party provider 104). Thus, partnership service 102 may act as a repository of configuration information in any of a variety of contexts, thereby ensuring data consistency and availability, while reducing data duplication and complexity of associated computing functionality.

Figure 2A:
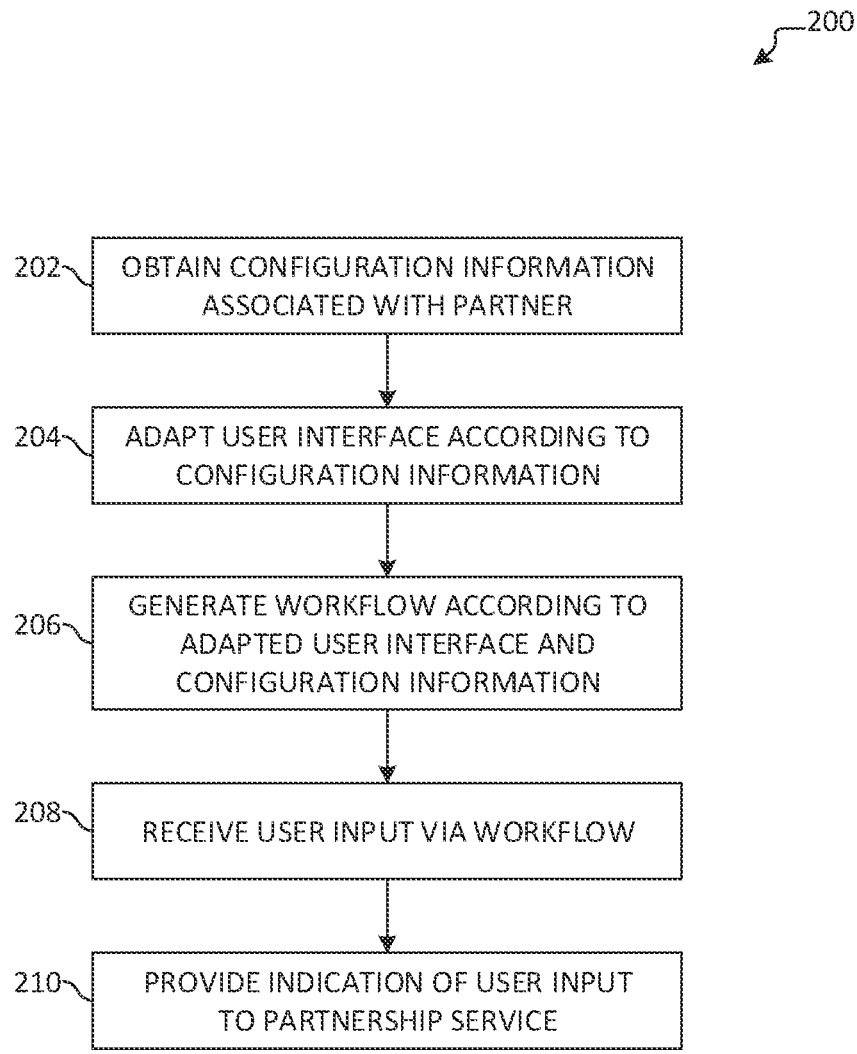
FIG. 2A illustrates an overview of an example method for adapting the user experience of a partnership service according to aspects of the present disclosure.

FIG. 2A illustrates an overview of an example method 200 for adapting the user experience of a partnership service according to aspects of the present disclosure. In examples, aspects of method 200 are performed by an application, such as applications 120 or 122 discussed above with respect to FIG. 1. In other examples, aspects of method 200 may be performed by a request processor, such as request processor 114, for example to generate a website as described above.

Method 200 begins at operation 202, where configuration information associated with a partner is obtained. For example, the configuration information may be obtained from a partnership service or a data availability service, such as partnership service 102 or data availability service 110 discussed above with respect to FIG. 1. In examples, operation 202 may comprise performing aspects of method 250 discussed below with respect to FIG. 2B. For instance, operation 202 may comprise generating a request for configuration information from a partnership service. The request may comprise attributes usable to identify configuration associated with a provider, such as a provider identifier, a tenant identifier, or an indication of a geographic region associated with a device or a user thereof. In response, configuration may be received, for example from a configuration engine, such as configuration engine 116 discussed above with respect to FIG. 1.

Flow progresses to operation 204, where a user interface is adapted according to the configuration information. For example, the user interface may be part of a website (e.g., as may be generated by a request processor) or an application. As discussed above, the configuration information may be used to adapt icons, logos, stylesheets, colors, or layouts, as well as content therein. While configuration engine 116 is described as processing a hierarchy of configuration items, it will be appreciated that, in other examples, such a hierarchy may be processed as part of method 200 (e.g., rather than utilizing resulting configuration information, as illustrated in the instant example).

At operation 206, a workflow is generated according to the adapted user interface and configuration information. For example, the user interface generated at operation 204 may be presented to a user according to at least in part to the configuration information. Thus, the configuration information may configure both visual and functional aspects of the disclosed service platform. For example, operation 206 may comprise determining an order for various pages of a workflow (e.g., each of which may be visually adapted according to aspects of operation 204), whether such pages would be displayed, what information would be requested from a user, and/or how received user input would be processed.

Moving to operation 208, user input is received via the generated workflow. For example, a user may navigate through the workflow, where the user provides user input to progress through the workflow. The user input may be validated according to the configuration information. Example user input includes, but is not limited to, actuation of a user interface element, text entry, or file selection, among other examples.

Accordingly, at operation 210, an indication of the received user input is provided to a partnership service. In examples where the user input is processed as part of operation 208, a processing result of operation 208 may be provided as an alternative to or in addition to the received user input. In some examples, the user input may be provided to the partnership service in conjunction with attributes similar to those used to obtain configuration information at operation 202, such that the partnership may similarly identify configuration information with which to process the user input. In other examples, at least a part of the configuration itself may be provided. While method 200 is illustrated as an example in which at least a part of the processing of the received user input is performed at the partnership service (e.g., as a result of providing the indication at operation 210), it will be appreciated that similar techniques may be used in instances where processing is performed on-device using configuration that is obtained at operation 202. Method 200 terminates at operation 210.

Figure 2B:
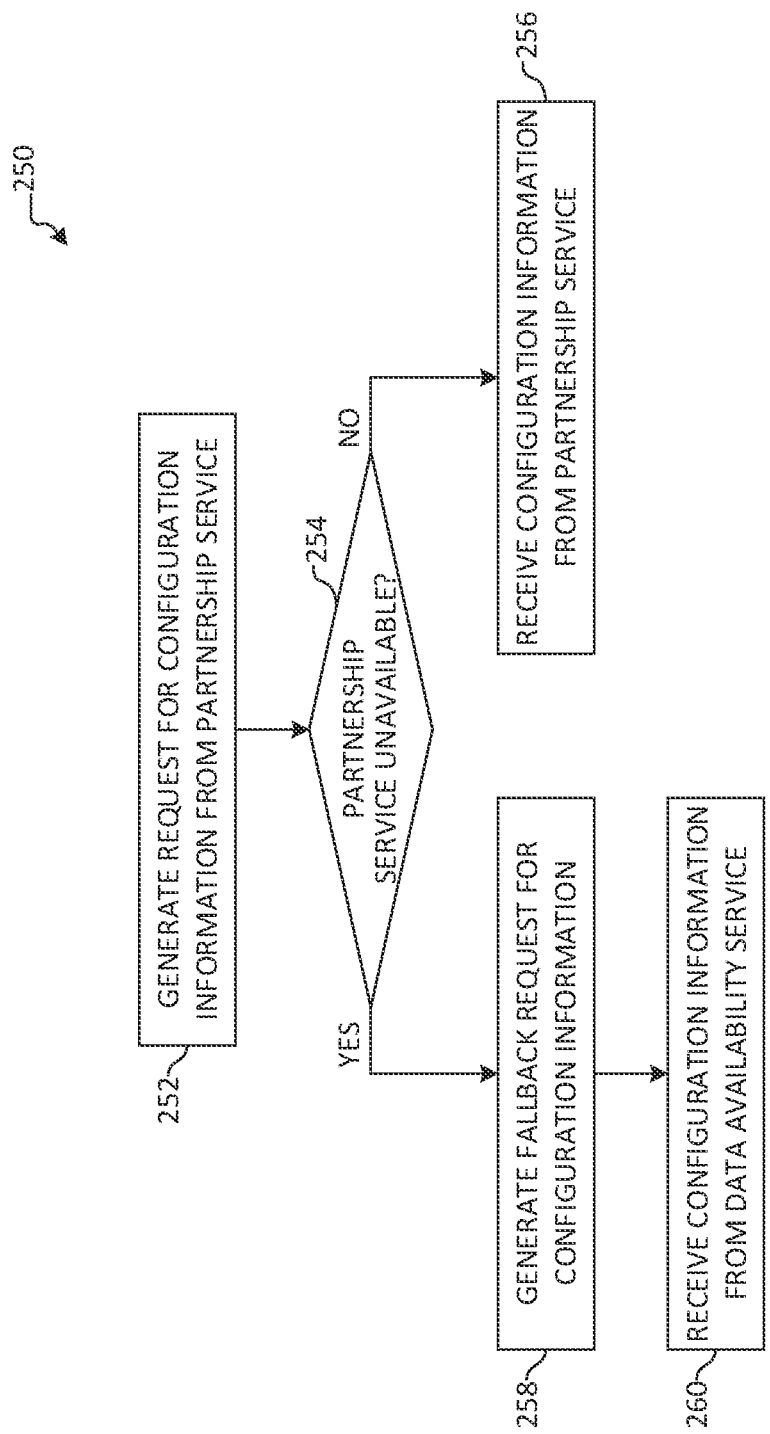
FIG. 2B illustrates an overview of an example method for obtaining configuration information according to aspects of the present disclosure.

FIG. 2B illustrates an overview of an example method 250 for obtaining configuration information according to aspects of the present disclosure. For example, aspects of method 250 may be performed by an application, such as applications 120 or 122 discussed above with respect to FIG. 1. In other examples, aspects of method 200 may be performed by a request processor, such as request processor 114, for example to generate a website as described above. As noted above, aspects of method 250 may be performed as part of operation 202 discussed above with respect to FIG. 2B.

As illustrated, method 250 begins at operation 252, where a request for configuration information is generated. For example, the configuration information may be requested from a partnership service, such as partnership service 102 in FIG. 1. The request may comprise attributes usable to identify configuration associated with a provider, such as a provider identifier, a tenant identifier, or an indication of a geographic region associated with a device or a user thereof. While example attributes are described, it will be appreciated that any of a variety of alternative or additional attributes may be provided.

At determination 254, it may be determined whether the partnership service is unavailable. For example, determination 254 may comprise determining a predetermined period of time has elapsed (e.g., such that the request at operation 252 has timed out) or that an error was received at operation 252 (e.g., as may be the case when the partnership service is experiencing a configuration issue or other unavailability condition). In other instances, determination 254 may comprise determining a response has been received from the partnership service, such that it may be determined that the partnership service is not unavailable.

Thus, if it is determined that the partnership service is not unavailable, flow branches "NO" to operation 256, where configuration information is received from the partnership service. In examples, the received configuration information may be cached for a predetermined amount of time, such that the configuration information need not be requested for every instance in which it is used to configure functionality associated with the partnership service. Similarly, after the predetermined amount of time, the configuration information may be refreshed, thereby enabling configuration changes to propagate. Method 250 terminates at operation 256.

In other examples, flow branches "YES" at determination 254 when it is determined that the partnership service is unavailable. Accordingly, a fallback request for configuration is generated at operation 258. The fallback request may be similar to the request generated at operation 252, but may instead be provided to a data availability service, such as data availability service 110 discussed above with respect to FIG. 1. Accordingly, at operation 260, configuration information is received from the data availability service. Such aspects may be similar to those of operation 256 discussed above. Method 250 terminates at operation 258. While method 250 is illustrated as issuing a single fallback request, it will be appreciated that any number of such requests may be issued for example to the same or a different data availability service.

Figure 3:
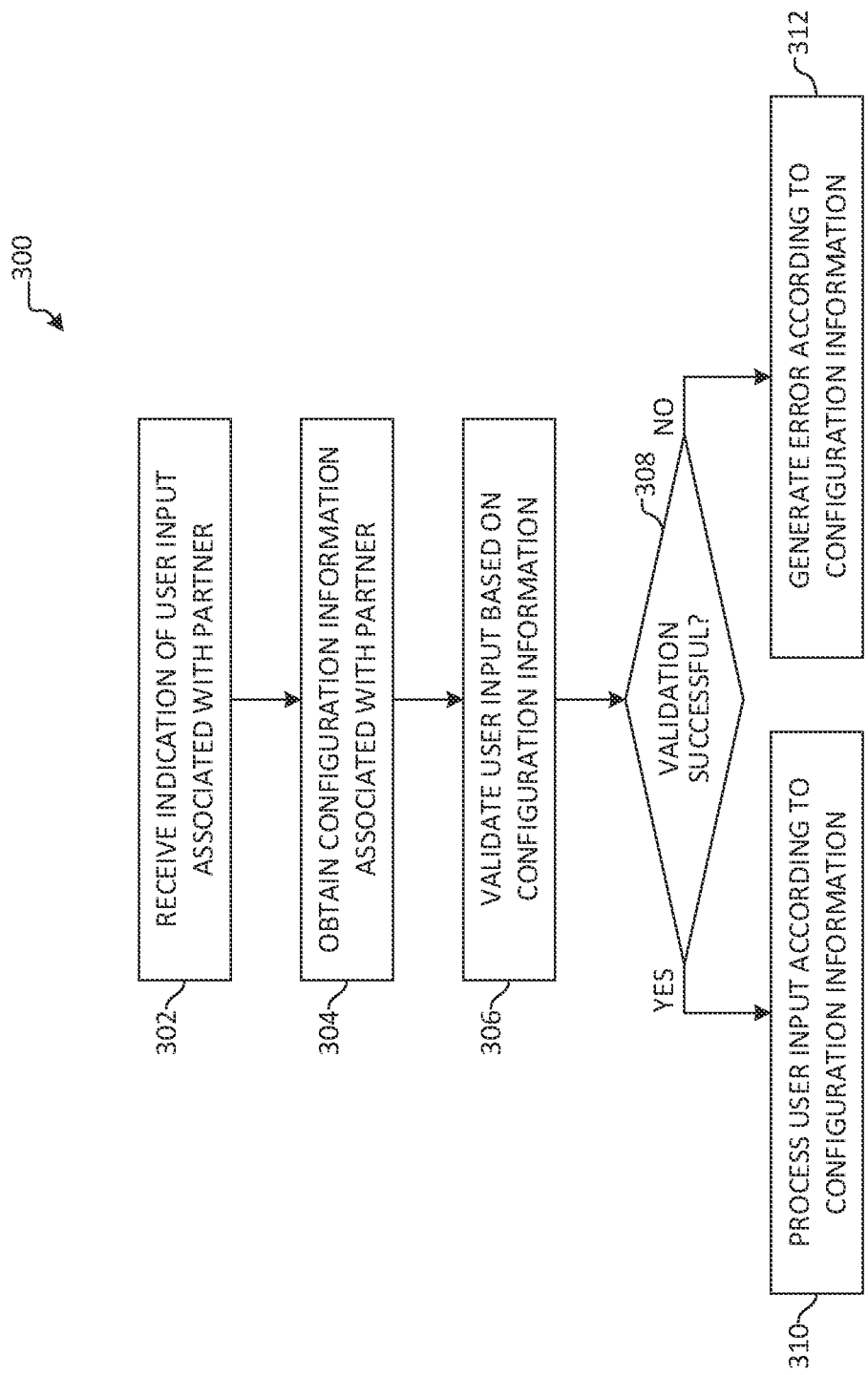
FIG. 3 illustrates an overview of an example method for processing user input according to configuration information of a partner by a partnership service according to aspects of the present disclosure.

FIG. 3 illustrates an overview of an example method 300 for processing user input according to configuration information of a partner by a partnership service according to aspects of the present disclosure. In examples, aspects of method 300 may be performed by a partnership service, such as partnership service 102 in FIG. 1.

Method 300 begins at operation 302, where an indication of user input associated with a partner is received. For example, the indication may be received from an application associated with a partner (e.g., applications 120 or 122 in FIG. 1) or via a website provided by the partnership service, among other examples. As described above, the indication may comprise a set of attributes or, as another example, operation 302 may comprise determining attributes associated with the received indication. For example, an association with a partner may be determined based on a domain, subdomain, or email address from which the indication was received, among other examples.

At operation 304, configuration information associated with the partner is obtained. Aspects of operation 304 may be similar to those of operation 202 and/or method 250 discussed above with respect to FIGS. 2A and 2B, respectively. For example, the configuration information may be obtained based on attributes that were received or otherwise determined at operation 302, such as a provider identifier, a tenant identifier, or an indication of a geographic region associated with a device or a user thereof.

At operation 306, user input is validated according to the configuration information that was obtained at operation 304. As noted above, the configuration information may specify criteria, matching logic, or executable data usable to process user input accordingly. While example validation techniques are described herein, it will be appreciated that configuration information may specify any of a variety or additional such validation techniques. Accordingly, at determination 308, it is determined whether validation was successful.

If it is determined that validation was successful, flow branches "YES" to operation 310, where the user input is further processed according to the configuration information. For example, a processing result may be generated at operation 310 according to the configuration information, which may be stored and/or subsequently processed as specified by the configuration information. As another example, the processed user input may be used to advance a workflow, for example to generate an electronic communication based on the user input that is provided to a user associated with the provider. Method 300 terminates at operation 310.

If, however, it is determined that validation was not successful, flow branches "NO" to operation 312, where an error may be generated according to the configuration information. For example, the error may comprise an associated description or suggestion, as may be specified by the configuration information. In some instances, the configuration information may similarly indicate user interface aspects associated with the error, such as the location, text, and associated action of one or more buttons. Method 300 terminates at operation 312.

As discussed above with respect to method 200, such aspects need not be restricted to a client-server paradigm, and may similarly be applied server-side and/or client-side. For example, a request processor may perform aspects of both method 200 and method 300, as may be the case when the request processor is providing a website associated with a provider.

Figure 4:
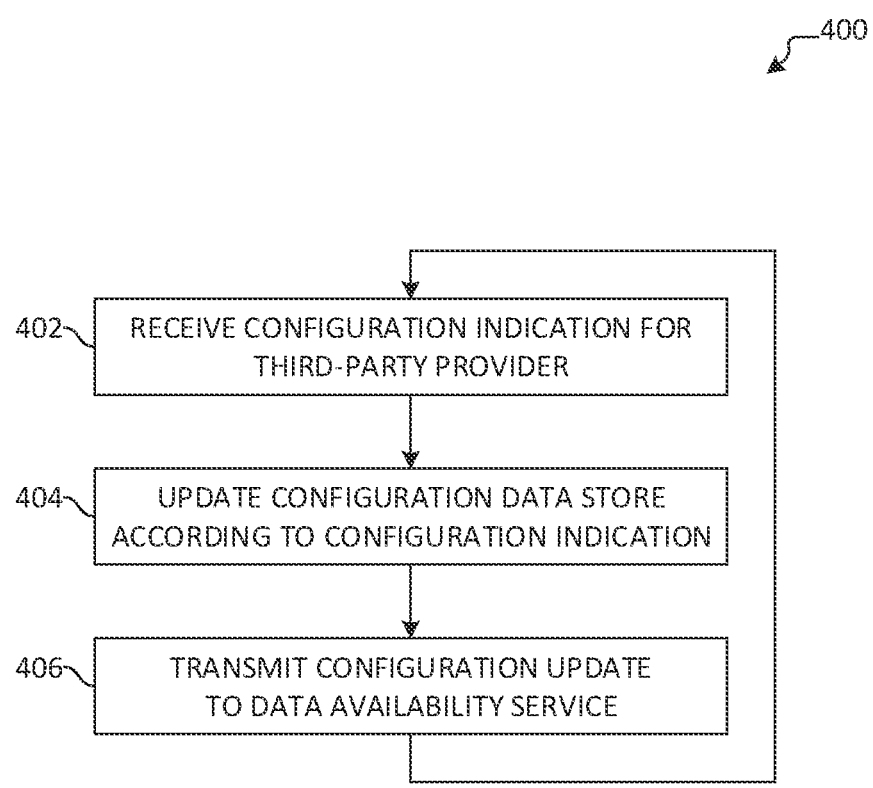
FIG. 4 illustrates an overview of an example method for providing configuration information to a data availability service according to aspects described herein.

FIG. 4 illustrates an overview of an example method for providing configuration information to a data availability service according to aspects described herein. In examples, aspects of method 400 are performed by a configuration engine, such as configuration engine 116 discussed above with respect to FIG. 1.

Method 400 begins at operation 402, where a configuration indication is received for a third-party provider. For example, the indication may specify a configuration for functionality of a partnership service, such as partnership service 102 in FIG. 1. In examples, the indication may comprise a selection of at least a part of a preexisting configuration. The configuration indication may be associated with previously configured functionality of the partnership service, or may be a configuration indication that is used to generate a new configuration item or to remove a configuration item associated with such functionality. In examples, the configuration indication may be the first configuration indication associated with a provider, such that the partnership service is being configured to be used in association with a new provider. The configuration indication may be received via a website or an API, among other examples.

At operation 404, a configuration data store is updated according to the configuration indication. For example, the configuration data store may be configuration data store 118 discussed above with respect to FIG. 1. In examples, updating the configuration data store comprises generating a new configuration item according to the configuration indication, for example within a hierarchy as described above. The configuration indication received at operation 402 may comprise an indication of one or more attributes with which the configuration item should be associated within the configuration data store or, as another example, such attributes may be determined at operation 404. In instances where the configuration indication comprises a selection of a preexisting configuration, operation 404 may comprise generating configuration items according to the selected preexisting configuration that are associated with the set of attributes accordingly. While method 400 is described in the context of a single configuration item, it will be appreciated that similar aspects may be used to process multiple configuration indication. As another example, multiple configuration items may be generated as a result of a single configuration indication.

Flow progresses to operation 406, where a configuration update is transmitted to a data availability service. As described above, the update may comprise a representation of the configuration data store, for example at least a subpart of a hierarchy or a static representation of the resulting configuration information, among other examples. In some examples, multiple iterations of operations 402 and 404 may be performed prior to operation 406, as may be the case when the data availability service is updated periodically. For example, operation 406 may be performed after a predetermined amount of time, after a predetermined number of changes, or in response to a user indication to update the data availability service, among other examples. Method 400 terminates at operation 406.

Figure 5:
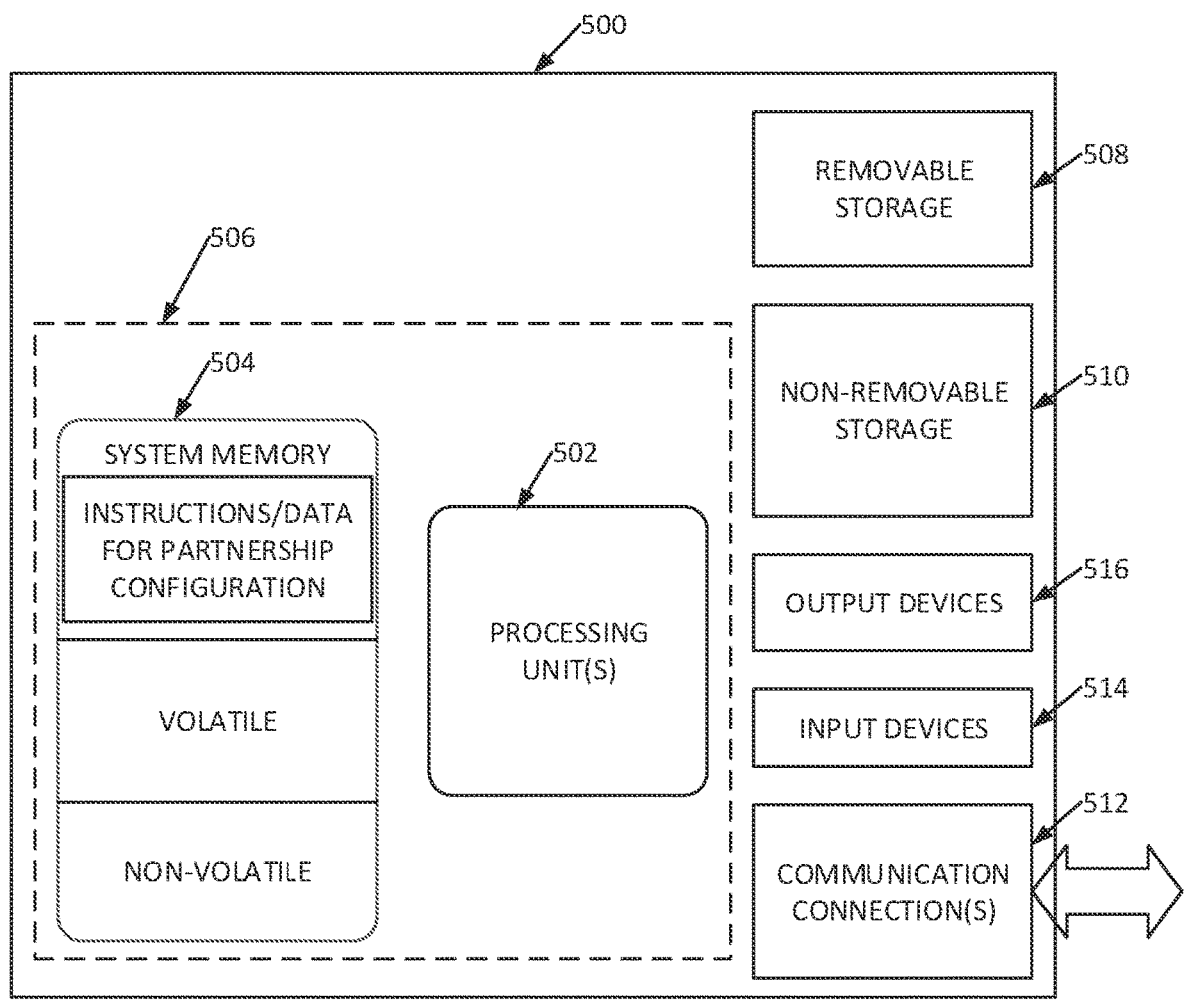
FIG. 5 illustrates an example of a suitable operating environment in which one or more aspects of the present application may be implemented.

FIG. 5 illustrates an example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically may include at least one processing unit 502 and memory 504. Depending on the exact configuration and type of computing device, memory 504 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as a keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 may include at least some form of computer readable media. The computer readable media may be any available media that can be accessed by processing unit 502 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium, which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 504. While executing on the processing unit 502, program modules (e.g., applications, Input/Output (I/O) management, and other utilities) may perform processes including, but not limited to, one or more of the stages of the operational methods described herein such as the methods illustrated in FIG. 2A, 2B, 3, or 4, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 500 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

As will be understood from the foregoing disclosure, one aspect of the technology relates to a system comprising: at least one processor; and memory storing instructions that, when executed by the at least one processor, causes the system to perform a set of operations. The set of operations comprises: receiving a configuration indication associated with functionality of a partnership service; generating, based on the configuration indication, a configuration item to configure the functionality of the partnership service, wherein the configuration item is associated with a provider of the partnership service; receiving, from a customer device, a request associated with the provider; determining, based on an association of the request with the provider, configuration information associated with the configuration item; and adapting the partnership service according to the functionality indicated by the configuration item. In an example, receiving a configuration indication associated with functionality of a partnership service; generating, based on the configuration indication, a configuration item to configure the functionality of the partnership service, wherein the configuration item is associated with a provider of the partnership service; receiving, from a customer device, a request associated with the provider; determining, based on an association of the request with the provider, configuration information associated with the configuration item; and adapting the partnership service according to the functionality indicated by the configuration item. In another example, the configuration item is stored in association with the provider in a configuration data store according to a hierarchy. In a further example, the configuration indication is a selection of a preexisting configuration. In yet another example, the configuration item is stored in association with an attribute indicating the provider and the request further comprises the attribute. In a further still example, the configuration item is stored in further association with an attribute indicating a geographic region and the request further comprises the attribute indicating the geographic region. In another example, the functionality relates to at least one of a user interface, content, or processing.

In another aspect, the technology relates to a method for processing configuration information to adapt functionality of a partnership service. The method comprises: obtaining configuration information associated with a provider; adapting, based at least in part on the configuration information, a user interface element of a user interface; receiving, via the user interface, user input associated with a workflow, wherein the workflow is adapted based at least in part on the configuration information; and processing the user input according to the configuration information. In an example, obtaining the configuration information comprises: requesting the configuration information from a partnership service; and based on determining the partnership service is unavailable, obtaining the configuration information from a data availability service. In another example, obtaining the configuration information comprises providing an indication of a set of attributes, the set of attributes comprising a first attribute associated with the provider and a second attribute associated with a geographic region. In a further example, the user input comprises providing the user input to the partnership service in association with an attribute indicating the provider. In yet another example, processing the user input comprises processing the user input according to binary data of the configuration information. In a further still example, the method further comprises: validating the user input based at least in part on validation criteria of the configuration information.

In a further aspect, the technology relates to a method for adapting a partnership service for a provider. The method comprises: receiving a configuration indication associated with functionality of a partnership service; generating, based on the configuration indication, a configuration item to configure the functionality of the partnership service, wherein the configuration item is associated with a provider of the partnership service; receiving, from a customer device, a request associated with the provider; determining, based on an association of the request with the provider, configuration information associated with the configuration item; and adapting the partnership service according to the functionality indicated by the configuration item. In an example, the provider is a first provider; the customer device is a first customer device; the request is a first request; the configuration item is a first configuration item; and the method further comprises: receiving, from a second customer device, a second request associated with a second provider; and adapting the partnership service according to a second configuration item associated with the second provider to process the second request. In another example, the configuration item is stored in association with the provider in a configuration data store according to a hierarchy. In a further example, the configuration indication is a selection of a preexisting configuration. In yet another example, the configuration item is stored in association with an attribute indicating the provider and the request further comprises the attribute. In a further still example, the configuration item is stored in further association with an attribute indicating a geographic region and the request further comprises the attribute indicating the geographic region. In an example, the functionality relates to at least one of a user interface, content, or processing.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, causes the system to perform a set of operations, the set of operations comprising:
   receiving a configuration indication associated with functionality of a partnership service;
   generating, based on the configuration indication, a first configuration item to configure the functionality of the partnership service, wherein the first configuration item is associated with a first provider of the partnership service;
   receiving, from a first customer device, a first request for the functionality of the partnership service, wherein the request has an association with the first provider;
   identifying, from a configuration data store based on the association of the request with the first provider, configuration information associated with the first configuration item;
   adapting the functionality of the partnership service according to the configuration information, thereby providing a first adapted functionality to the first customer device in response to the first request;
   receiving, from a second customer device, a second request for the functionality of the partnership service, wherein the second request has an association with a second provider different than the first provider;
   identifying, from the configuration data store and based on the association of the second request with the second provider, a second configuration item for configuring the functionality of the partnership service; and
   adapting the functionality of the partnership service according to the second configuration item, thereby providing a second adapted functionality to the second customer device in response to the second request.

2. The system of claim 1, wherein the configuration item is stored in association with the provider in the configuration data store according to a hierarchy.

3. The system of claim 1, wherein the configuration indication is a selection of a preexisting configuration.

4. The system of claim 1, wherein the first configuration item is stored in association with an attribute indicating the first provider and the first request further comprises the attribute.

5. The system of claim 4, wherein the first configuration item is stored in further association with an attribute indicating a geographic region and the first request further comprises the attribute indicating the geographic region.

6. The system of claim 1, wherein the functionality relates to at least one of a user interface, content, or processing.

7. The system of claim 1, wherein the set of operations further comprises determining, for each of the first request and the second request, the respective association with the first provider or the second provider.

8. A method for adapting a partnership service for a provider, comprising:
   receiving a configuration indication associated with functionality of a partnership service;
   generating, based on the configuration indication, a first configuration item to configure the functionality of the partnership service, wherein the first configuration item is associated with a first provider of the partnership service;
   receiving, from a first customer device, a first request for the functionality of the partnership service, wherein the request has an association with the first provider;
   identifying, from a configuration data store based on the association of the first request with the first provider, configuration information associated with the first configuration item;

adapting the functionality partnership service according to the configuration information, thereby providing a first adapted functionality to the first customer device in response to the first request;

receiving, from a second customer device, a second request for the functionality of the partnership service, wherein the second request has an association with a second provider different than the first provider;

identifying, from the configuration data store and based on the association of the second request with the second provider, a second configuration item for configuring the functionality of the partnership service; and adapting the functionality of the partnership service according to the second configuration item, thereby providing a second adapted functionality to the second customer device in response to the request.

9. The method of claim 8, wherein the configuration item is stored in association with the provider in the configuration data store according to a hierarchy.

10. The method of claim 8, wherein the configuration indication is a selection of a preexisting configuration.

11. The method of claim 8, wherein the first configuration item is stored in association with an attribute indicating the first provider and the first request further comprises the attribute.

12. The method of claim 11, wherein the first configuration item is stored in further association with an attribute indicating a geographic region and the first request further comprises the attribute indicating the geographic region.

13. The method of claim 8, wherein the functionality relates to at least one of a user interface, content, or processing.

14. The method of claim 8, further comprising determining, for each of the first request and the second request, the respective association with the first provider or the second provider.

* * * * *